US008243347B2

(12) United States Patent  
Okada

(10) Patent No.: US 8,243,347 B2  
(45) Date of Patent: Aug. 14, 2012

(54) IMAGE PROCESSING APPARATUS AND METHOD WITH READING MISTAKE PREVENTING FUNCTION DURING DOCUMENT READING

(75) Inventor: Mikiya Okada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 586 days.

(21) Appl. No.: 12/476,362

(22) Filed: Jun. 2, 2009

(65) Prior Publication Data

US 2009/0303551 A1   Dec. 10, 2009

(30) Foreign Application Priority Data

Jun. 6, 2008   (JP) ................................ 2008-148902

(51) Int. Cl.  
*H04N 1/04* (2006.01)

(52) U.S. Cl. ......... 358/474; 358/496; 358/497; 358/498

(58) Field of Classification Search ............ 358/474, 358/496, 497, 498  
See application file for complete search history.

(56) References Cited

U.S. PATENT DOCUMENTS

| 7,443,551 B2 * | 10/2008 | Aoki et al. ............. 358/498 |
| 7,557,968 B2 * | 7/2009 | Onodera ................ 358/498 |
| 2005/0013620 A1 | 1/2005 | Sugita et al. | |

FOREIGN PATENT DOCUMENTS

| JP | 4-252561 A | 9/1992 |
| JP | 7-245695 A | 9/1995 |
| JP | 2003-152962 | 5/2003 |
| JP | 2003-198803 | 7/2003 |
| JP | 2003-348275 | 12/2003 |
| JP | 2005-051743 A | 2/2005 |
| JP | 2005-286526 A | 10/2005 |

* cited by examiner

*Primary Examiner* — Houshang Safaipour  
(74) *Attorney, Agent, or Firm* — Renner, Otto, Boisselle & Sklar, LLP

(57) ABSTRACT

An image processing apparatus includes: a platen; a document cover mounted to be opened/closed on the platen; a document reader provided in relation to the platen, for reading an image of a document placed on the platen; an opening/closing detector provided in relation to the platen and the document cover, for detecting opening/closing of the document cover; an operation panel designating how the read document is to be arranged at the time of output; a document output device arranging and outputting the document images read by the document reader, in accordance with the arrangement designated by the operation panel; and a reading operation controller inhibiting document reading, when a specific arrangement of document images is designated by the operation panel and opening/closing operation of the document cover is not detected by the opening/closing detector.

17 Claims, 13 Drawing Sheets

IMAGE PROCESSING APPARATUS AND METHOD WITH READING MISTAKE PREVENTING FUNCTION DURING DOCUMENT READING

CROSS-REFERENCE TO RELATED APPLICATION

This nonprovisional application claims priority under 35 U.S.C. §119(a) on Patent Application No. 2008-148902 filed in Japan on Jun. 6, 2008, the entire contents of which are hereby incorporated by reference.

BACKGROUND OF THE INVENTION

1. Field of the Invention

The present invention relates to an image processing apparatus reading and performing prescribed process on an image and, more specifically, it relates to an image processing apparatus having a function of reading a plurality of images and arranging the images in a prescribed manner.

2. Description of the Background Art

In an image forming apparatus, there are two methods of reading a plurality of documents. In one method, documents are placed one by one on a platen and read one by one in order. In the other method, an ADF (Auto Document Feeder) is mounted on a document cover of the image forming apparatus, and thereby the documents are fed and read in order.

In the method of reading with ADF, document sheets are set on the apparatus with the document cover closed. Therefore, it is necessary for the user before setting the document to confirm that nothing is placed on the platen.

Japanese Patent Laying-Open No. 2003-198803 (hereinafter referred to as '803 reference) discloses a technique for preventing a reading operation using ADF with a document left on the platen, in which once a document is read using a platen of the document reading apparatus, a reading operation by the ADF is inhibited until ADF itself is once opened and closed.

Current image processing apparatuses have a so-called N-in-1 function (multi-shot function), in which a plurality of (N) document sheets are read and reduced, and reproduced as one image data. This function is convenient for the user in that the document containing a number of sheets can be viewed at a sight and the number of sheets of recording paper can be reduced. Further, other than the printing purpose, this function can be utilized in various and many ways as a plurality of image files can be put together for collective handling.

In order to utilize this function, however, it is necessary to read document sheets in a correct reading order. If a user manually changes sheets of document for reading without using ADF, reading in unintended order may occur due to a mistake by the user forgetting exchange of the document sheets. If read in erroneous order, the resulting print would be a waste of recording paper and if the result is handled as data, correctness of the data is questionable. It becomes necessary for the user to restart the document reading operation from the beginning, which is rather troublesome.

Such a problem can be solved by the use of ADF. The ADF, however, is not free from the possibility of damaging documents. Therefore, for instance, ADF is seldom provided on an image forming apparatus installed in a convenience store, to prevent potential damage to documents. In such a situation, manual feeding of document sheets for reading by the user is unavoidable, possibly leading to the problem described above.

Similar problem may be experienced when document reading order is of importance, such as in the case of forming double-sided copies of single-sided documents.

The technique described in '803 reference is after all a solution when ADF is used. Therefore, the technique is not available when the apparatus is not provided with ADF or when a plurality of document images are to be arranged in a prescribed manner without using ADF.

SUMMARY OF THE INVENTION

An object of the present invention is to provide an image processing apparatus that can prevent document reading in unintended order, when document sheets are read for a process in which a plurality of document images are to be arranged in a prescribed manner.

According to a first aspect, the present invention provides an image processing apparatus, including: a platen; a document cover attached to be opened/closed on the platen; a document reader provided in relation to the platen, for reading an image of a document placed on the platen; an opening/closing detector, provided in relation to the platen and the document cover, for detecting opening/closing of the document cover; an operation panel designating how the read images of the document are to be arranged at the time of output; a document output device for outputting images of the document read by the document reader arranged in accordance with the arrangement designated by the operation panel; and a reading operation controller inhibiting document reading by the document reader, when a specific arrangement of document images is designated by the operation panel and opening/closing operation of the document cover is not detected by the opening/closing detector.

When a specific arrangement of document images is designated by the operation panel and the document cover opening/closing operation is not detected, the reading operation controller inhibits reading of the document. By the reading operation controller as such, reading in unintended order can be prevented if correct reading order is essential. As a result, an image processing apparatus is provided, which can prevent reading of a plurality of document images in unintended order.

Preferably, the reading operation controller inhibits reading of a document by the document reader, when closed state of the document cover is not detected by the opening/closing detector.

When the document cover is open, the image processing apparatus inhibits the reading operation. This prevents reading operation with the document not correctly set. Thus, correct reading process is ensured.

Preferably, the reading operation controller inhibits, when the specific arrangement of document images is designated by the operation panel, reading of a next document by the document reader until opening/closing of the document cover is detected by the opening/closing detector after reading of document by the document reader.

When a specific arrangement of document images is designated, the image processing apparatus inhibits reading of the next document sheet until opening/closing of the document cover is detected after reading a document. This prevents reading of a document with the previous sheet of document left on the platen. Thus, correct reading process is ensured.

Preferably, the image processing apparatus further includes an inhibited state notifying device notifying inhibition of document reading, when document reading by the document reader is inhibited by the reading operation controller.

More preferably, the image processing apparatus further includes a document exchange notifying device notifying necessity of exchanging document, when reading of a next document by the document reader is inhibited by the reading operation controller.

When document reading is inhibited by the reading operation controller, the image processing apparatus notifies the reading inhibition. Receiving the notification, the user can confirm the status of image processing apparatus. If reading of the next document sheet is inhibited, the image processing apparatus informs the user that exchange of document sheet is necessary. As the image processing apparatus informs the user of the next operation, reading of documents in unintended order can be prevented.

Preferably, the image processing apparatus further includes an end-of-reading input device, receiving a user input indicating end of document reading in response to notification that document exchange is necessary from the document exchange notifying device, for ending document reading by the document reader.

Preferably, the specific arrangement of document images is N-in-1.

Preferably, the specific arrangement of document images is double-sided copy.

When arrangement of a plurality of document images in a prescribed manner, such as N-in-1 or double-sided copy, is set, the image processing apparatus performs the above-described reading operation control. N-in-1 and double sided copy are process settings in which document reading order is of high importance. As the reading operation control takes place upon such setting, mistake in reading order can be prevented when documents are read.

According to a second aspect, the present invention provides an image processing method, including the steps of: a computer detecting opening/closing of a document cover attached to be opened/closed on a platen; the computer receiving a designation input by a user related to a manner of arranging read document at the time of output; the computer reading an image of a document placed on the platen; the computer outputting images of the document read at the reading step, in accordance with document arrangement designated by the user; and the computer inhibiting reading of a next document, if a specific arrangement of document images is designated by the user and if opening/closing operation of the document cover is not detected at the detecting step.

Preferably, the image processing method further includes the step of the computer notifying necessity of document exchange, in response to inhibition of reading of the next document at the inhibiting step.

More preferably, the image processing method further includes the step of the computer receiving an input by the user indicating end of document reading in response to the notification of necessity of document exchange at the notifying step, and ending reading of the document image.

As described above, the image processing apparatus controls document reading operation by detecting opening/closing of the document cover, to prevent a mistake by the user forgetting exchange of the document sheet. As a result, an image processing apparatus can be provided, which can prevent reading of document in unintended order, when the document sheets are read for a process in which a plurality of document images are to be arranged in a prescribed manner.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
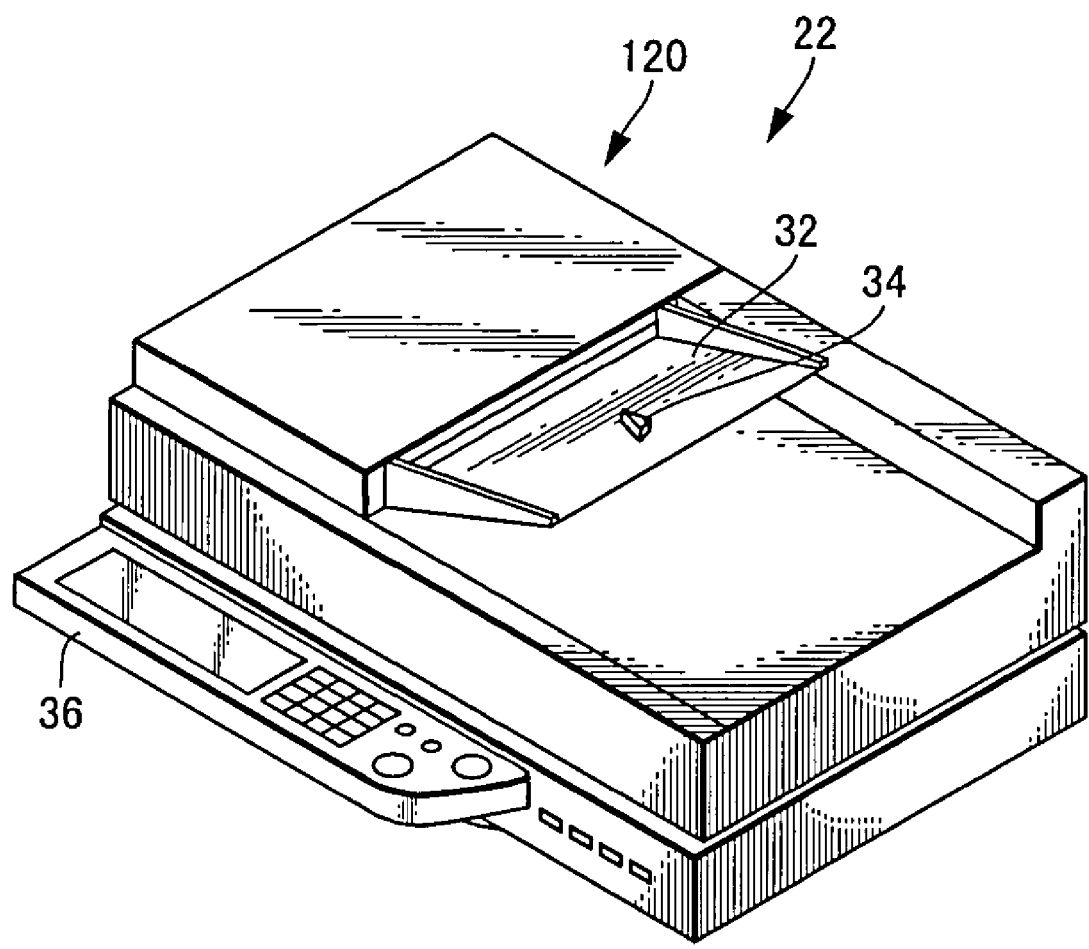
FIG. 1 is a perspective view of a document feeding and reading unit 22 in accordance with an embodiment of the present invention.

In the following, an embodiment of the present invention will be described in detail with reference to the appended figures. In the following description, the same components are denoted by the same reference characters and same names. Their functions are also the same. Therefore, detailed description thereof will not be repeated. Further, though an image processing apparatus having an image forming function such as a multi-functional printer will be described in the following, the present invention is also applicable to an apparatus not having the image forming function, such as a scanner.

—Structure—

Figure 2:
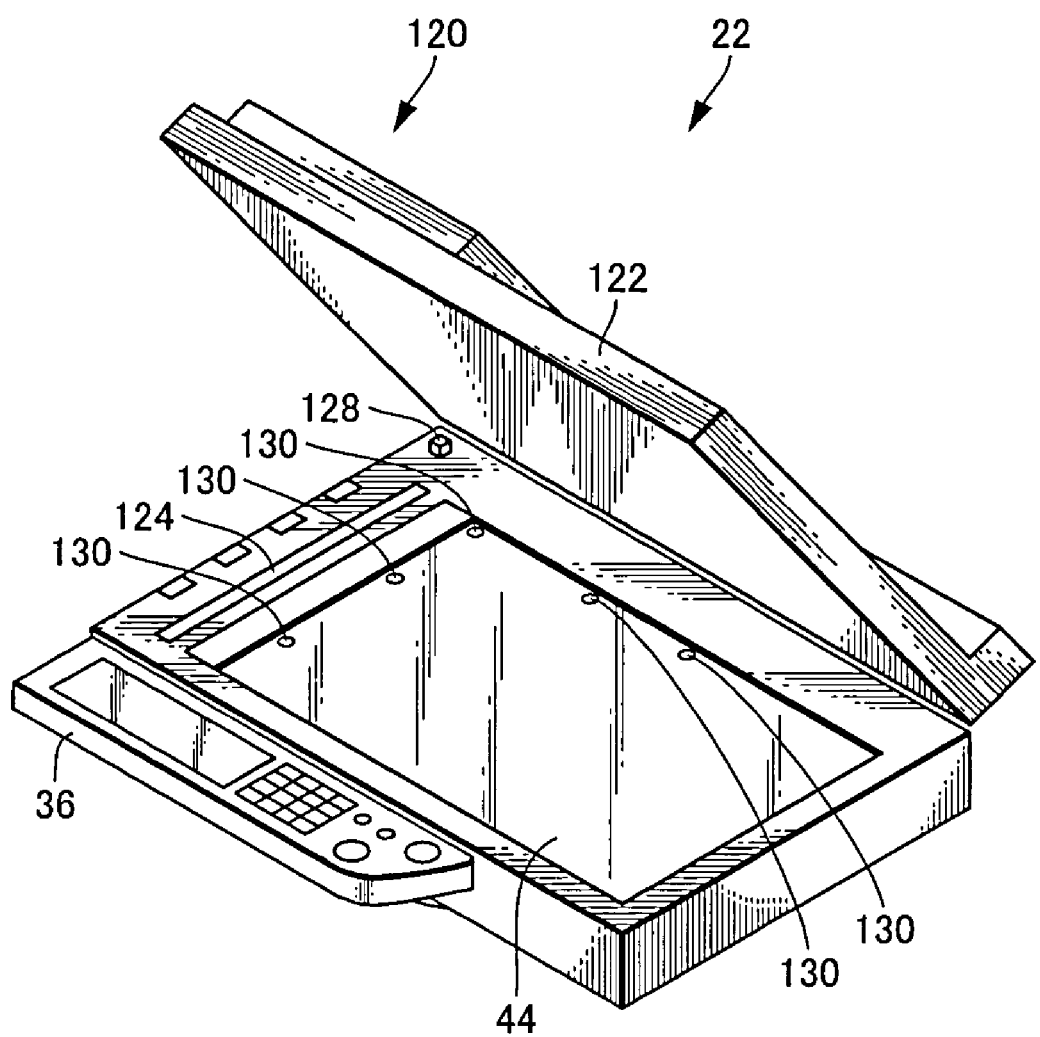
FIG. 2 is a perspective view of a document feeding and reading unit 22 when a document cover 122 is opened.

Mainly referring to FIGS. 1 and 2, a document feeding and reading unit 22 in accordance with the present embodiment includes: a platen glass 44, formed of glass and serving as a document placing platform when a document to be read is placed manually by a user; a document cover 122 pressing the document placed on platen glass 44 and shutting off external light; a document set tray 32 provided on document cover 122; an ADF 120 provided on document cover 122 and feeding the document placed on document set tray 32 when the document is to be read while it is fed; a document reading unit 124 used when the document is read while it is fed by ADF 120; an operating unit 36 operated by the user for operating document feeding and reading unit 22; a document cover opening/closing detection sensor 128 for detecting opening/closing of document cover 122; and a plurality of reflective sensors 130 arranged at prescribed positions inside platen glass 44, used for detecting the size of document placed on platen glass 44. Reflective sensor 130 also serves as a document detection sensor detecting whether there is any document placed on platen glass 44. On document set tray 32, a document detection sensor 34 is provided, for detecting setting of the document.

Document feeding and reading unit 22 is capable of operating in both of an operational mode in which document to be read is fed by ADF 120 while it is read by document reading unit 124, and an operational mode in which the document is placed on platen glass 44 to be read. The present embodiment is applied to the reading with the document placed on platen glass 44.

Document cover opening/closing detection sensor 128 outputs a signal that assumes a value D (hereinafter referred to as "cover opening/closing value), which assumes different values dependent on whether the document cover is open/closed. Cover opening/closing value D assumes logic 0 when the document cover is closed, and it assumed logic 1 when document cover is open.

Each of the plurality of reflective sensors 130 detects whether a document is placed at the position where the sensor is arranged, and outputs a detection signal. A logic sum signal of the detection signals indicates whether a document is placed on platen glass 44 or not. The value E of the logic sum signal (hereinafter referred to as "platen status value") assumes logic 0 when document is not detected on platen glass 44, and assumes logic 1 when a document is detected.

Figure 3:
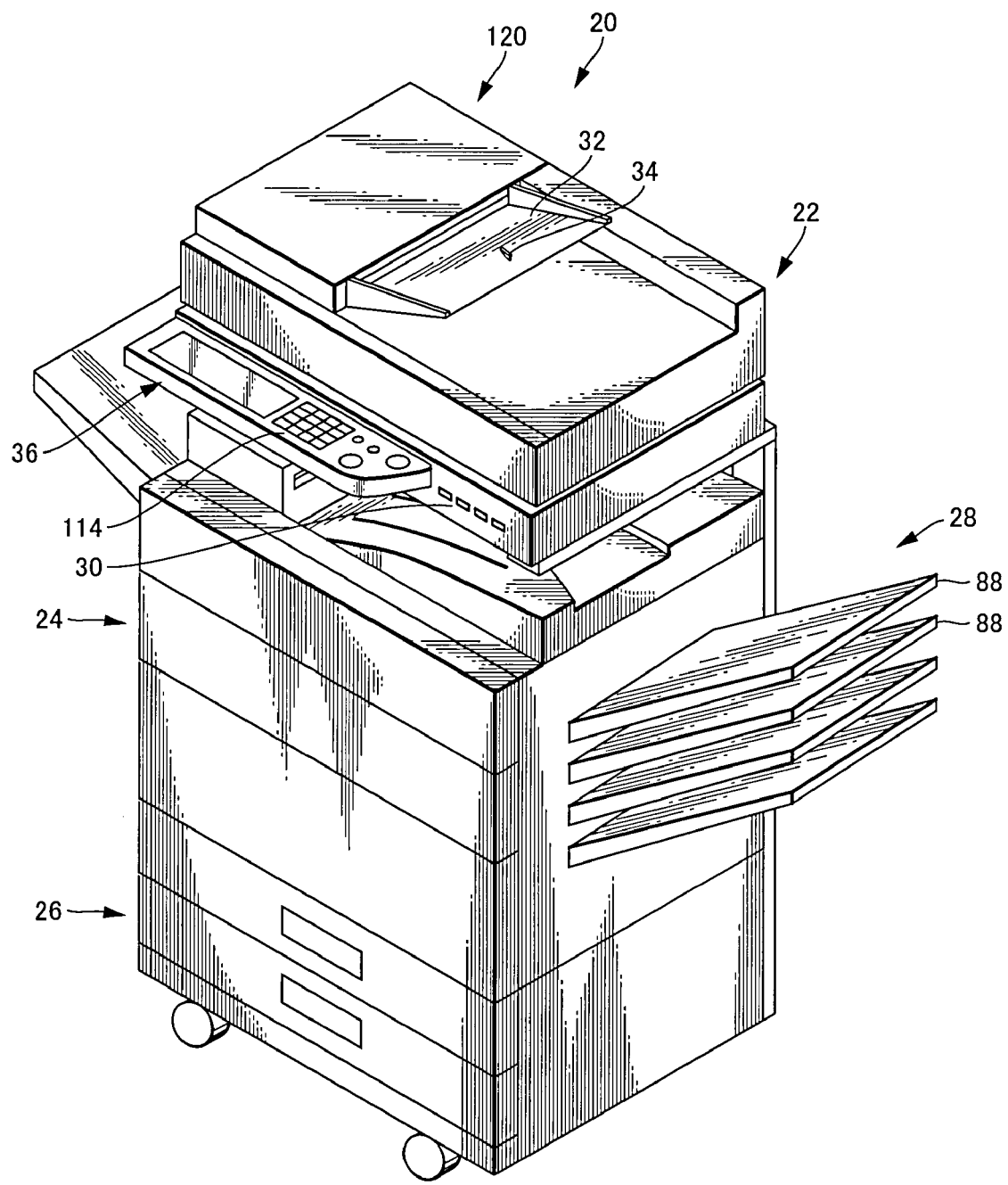
FIG. 3 is a perspective view showing an appearance of an image forming apparatus 20 having document feeding and reading unit 22.
Figure 4:
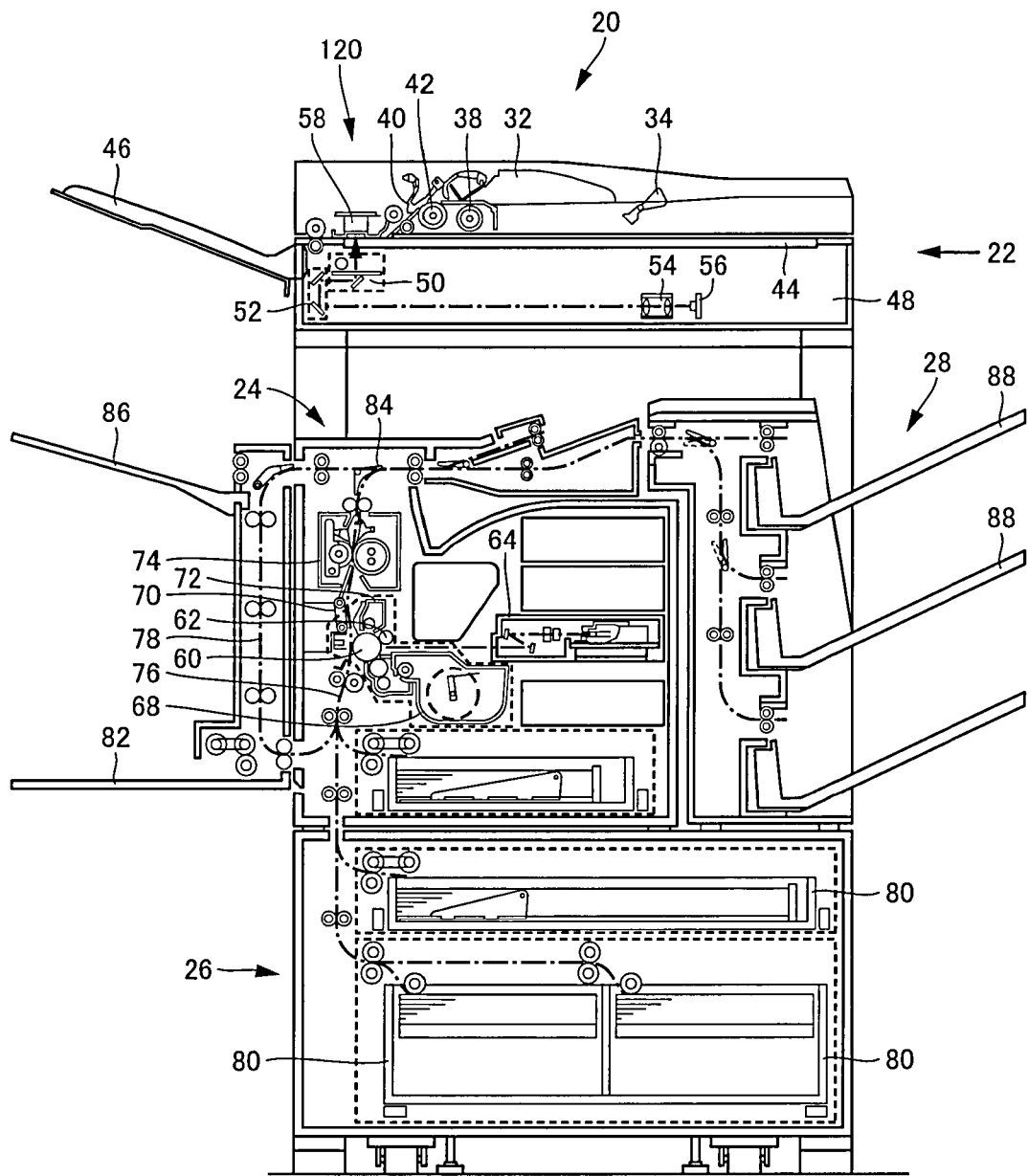
FIG. 4 is a cross-sectional view schematically showing an internal structure of image forming apparatus 20.

Mainly referring to FIGS. 3 and 4, image forming apparatus 20 is a digital multi-functional printer. Image forming apparatus 20 is capable of operating selectively in, for example, a copy mode in which an image of a document is read and printed on a sheet of printing paper, a facsimile mode in which an image of a document is read and transmitted and an image of a document is received and printed on a sheet of printing paper, and a printer mode in which an image received through a network from an information terminal, not shown, is printed on a sheet of printing paper. For easier understanding of the figures, reflective sensors 130 are not shown in FIG. 4.

Image forming apparatus 20 includes, in addition to the document feeding and reading unit 22, an image forming unit 24 for printing an image of the image data transmitted from document feeding and reading unit 22 or other apparatus on a sheet of recording paper, a paper feeding unit 26 for feeding the sheets of recording paper to image forming unit 24, a post processing device 28 for discharging sheets of recording paper on which printing has been done at image forming unit 24 in a manner designated by the user, and a USB (Universal Serial Bus) (registered trademark) interface 30 for exchanging data to/from the outside.

Internal configuration of image forming apparatus 20 will be described taking an operation in the copy mode as an example.

First, an operation of image forming apparatus 20 when document is read using the ADF will be described.

When a document is set on a document set tray 32 of document feeding and reading unit 22, a document detection sensor 34 detects that the document has been set. The user operates operating unit 36 of document feeding and reading unit 22 to input and set size of printing paper, magnification and the like, and inputs a copy start instruction.

In response to the input copy start instruction, document feeding and reading unit 22 draws the document on document set tray 32 one by one, by pick-up roller 38, and feeds the drawn document to a platen glass 44 through a separation plate 40 and a feed roller 42. Document feeding and reading unit 22 feeds the document in a sub-scanning direction on platen glass 44, and discharges the document to a document discharge tray 46.

At this time, image forming apparatus 20 reads a surface (lower surface) of the document, using a first document reading unit 48. Image forming apparatus 20 moves and positions a first scanning unit 50 of first document reading unit 48 to a prescribed position (position corresponding to document reading unit 124 of FIG. 2), and moves a second scanning unit 52 to a prescribed position. The first document reading unit 48 irradiates document surface through platen glass 44 with an exposure lamp of first scanning unit 50, and light reflected from the document is directed to an imaging lens 54 through reflection mirrors of first and second scanning units 50 and 52. The light reflected from the document is collected by imaging lens 54 to a CCD (Charge Coupled Device) 56, and the image on the document surface is formed on CCD 56, whereby the image on the document surface is read.

Further, image forming apparatus 20 reads a rear surface (upper surface) of the document, using a second document reading unit 58 provided on ADF 120. The second document reading unit 58 is arranged above platen glass 44. The second document reading unit 58 includes an exposure lamp, formed of an LED (Light Emitting Diode) array, a fluorescent lamp and the like, irradiating the rear surface of document, a SEL-FOC (registered trademark) lens array collecting light reflected from the document pixel by pixel, and a contact image sensor (CIS) performing photo-electric conversion of the light reflected from the document received through SEL-FOC (registered trademark) lens array and outputting an analog image signal.

Next, an operation of image forming apparatus 20 when a document placed on platen glass 44 is read will be described.

The user opens document cover 122 of document feeding and reading unit 22, and places a document on platen glass 44. Image forming apparatus 20 reads a surface of the document placed on platen glass 44, using first document reading unit 48. Here, first document reading unit 48 moves the first and second scanning units 50 and 52 in a sub-scanning direction while maintaining prescribed speed relation with each other. First document reading unit 48 exposes the document on platen glass 44 by first scanning unit 50, guides and collects light reflected from the document through reflection mirrors of the first and second scanning units 50 and 52, and the image is formed on CCD 56, whereby the image on the document surface is read.

Figure 6:
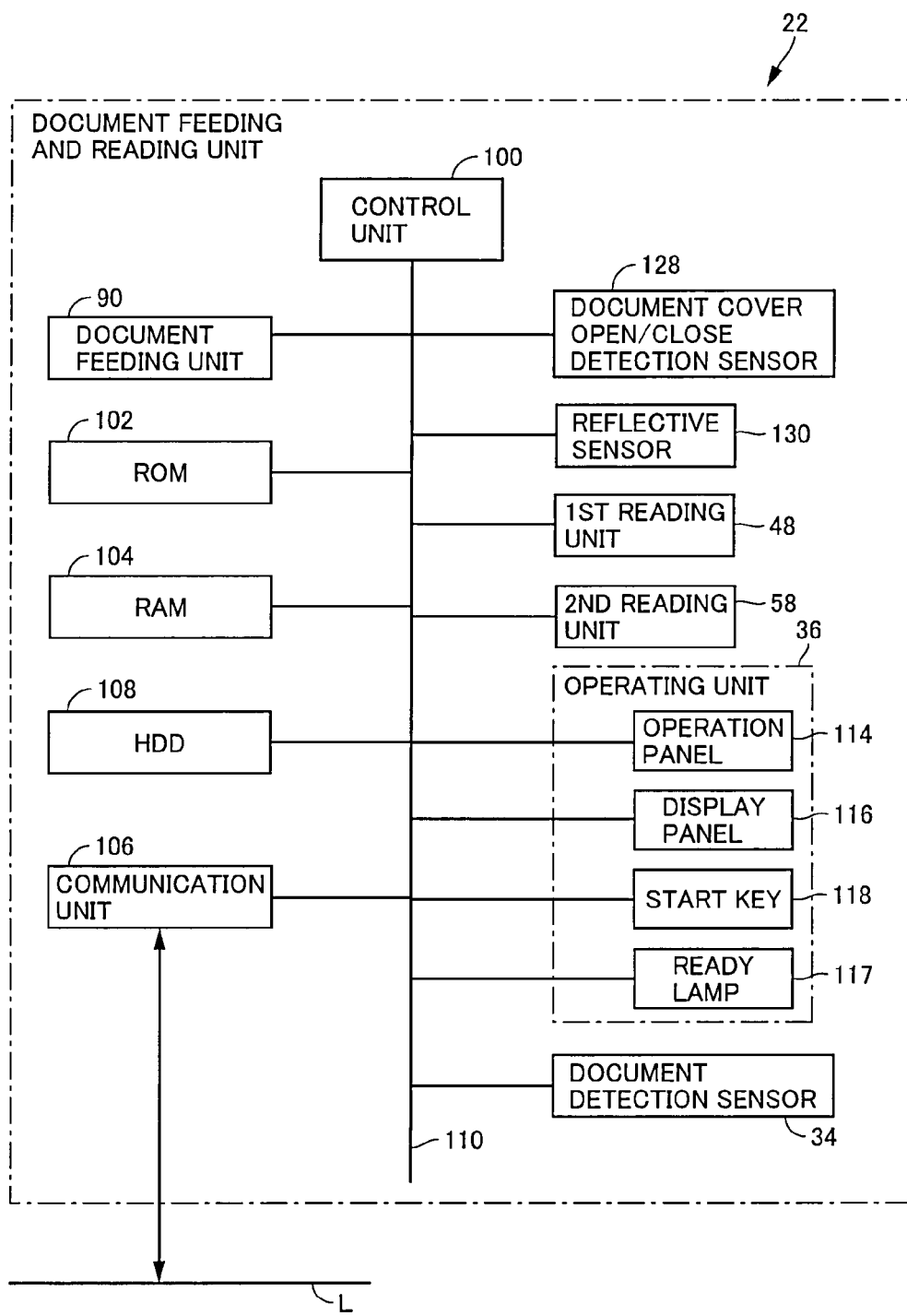
FIG. 6 is a block diagram showing hardware configuration of document feeding and reading unit 22.

When one or both surfaces of the document are read, the image forming apparatus 20 inputs image data representing the image or images on one or both surfaces of the document to a control unit 100 implemented, for example, by a microcomputer shown in FIG. 6, in which the image data is subjected to various types of image processing and output to image forming unit 24.

Image forming unit 24 prints the document image on a sheet of recording paper based on the image data. Image forming unit 24 includes a photoreceptor drum 60, a charger 62, a laser scanning unit (hereinafter denoted as "LSU") 64, a developer 68, a transfer device 70, a cleaning device 72, a fixing device 74, a neutralizer, not shown, and the like.

Further, image forming unit 24 is provided with a main feeding path 76 and a reverse feeding path 78. A sheet of recording paper fed from paper feeding unit 26 is fed along main feeding path 76. Paper feeding unit 26 draws sheets of recording paper contained in paper cassette 80 or placed on a manual feed tray 82 one by one, and feeds the drawn sheet of recording paper to main feeding path 76 of image forming unit 24.

While the sheet of paper is fed along main feeding path 76 of image forming unit 24, that is, while the sheet of paper passes between photoreceptor drum 60 and transfer device 70 and further through fixing device 74, printing is done on the sheet of recording paper.

Photoreceptor drum 60 rotates in one direction, and its surface is cleaned by cleaning device 72 and the neutralizer, and then uniformly charged by charger 62.

LSU 64 modulates laser beam based on the image data output from document feeding and reading unit 22. LSU 64 repeatedly scans the surface of photoreceptor drum 60 with the laser beam in the main scanning direction, whereby an electrostatic latent image is formed on the surface of photoreceptor drum 60.

Developer 68 develops the electrostatic latent image by supplying toner to the surface of photoreceptor drum 60, and forms a toner image on the surface of photoreceptor drum 60.

Transfer device 70 transfers the toner image on the surface of photoreceptor drum 60, to the sheet of recording paper passing through transfer device 70 and photoreceptor drum 60.

Fixing device 74 fixes the toner image on the sheet of recording paper, by applying heat and pressure to the sheet of recording paper.

At a connecting position between main feeding path 76 and reverse feeding path 78, a branching pawl 84 is provided. When printing is to be done only on one side of the sheet of recording paper, branching pawl 84 is positioned such that the sheet of recording paper fed from fixing device 74 is guided by branching pawl 84 to discharge tray 86 or to a post processing device 28.

Further, when printing is to be done on both surfaces of the sheet of recording paper, branching pawl 84 is turned in a prescribed direction so that the sheet of recording paper is guided to reverse feeding path 78. The sheet of recording paper is turned over as it passes through reverse feeding path 78, and then it is again fed to the main feeding path 76 and, as the sheet of recording paper is again fed along the main feeding path 76, printing is done on the rear surface, and the sheet is guided to discharge tray 86 or post processing device 28.

The sheet of recording paper on which printing has been done as described above is guided to discharge tray 86 or post processing device 28, and discharged to discharge tray 86 or to any of discharge trays 88 of post processing device 28.

Post processing device 28 is for performing processes of sorting and discharging a plurality of sheets of recording paper to discharge trays 88, punching each sheet of recording paper, and stapling the sheets of paper. By way of example, when a number of printed copies are to be prepared, post processing device sorts and discharges sheets of recording paper to discharge trays 88 such that sorted sets of copies are allotted one by one, and each set of sheets on each discharge tray 88 is punched or stapled, whereby printed copies are provided.

Figure 5:
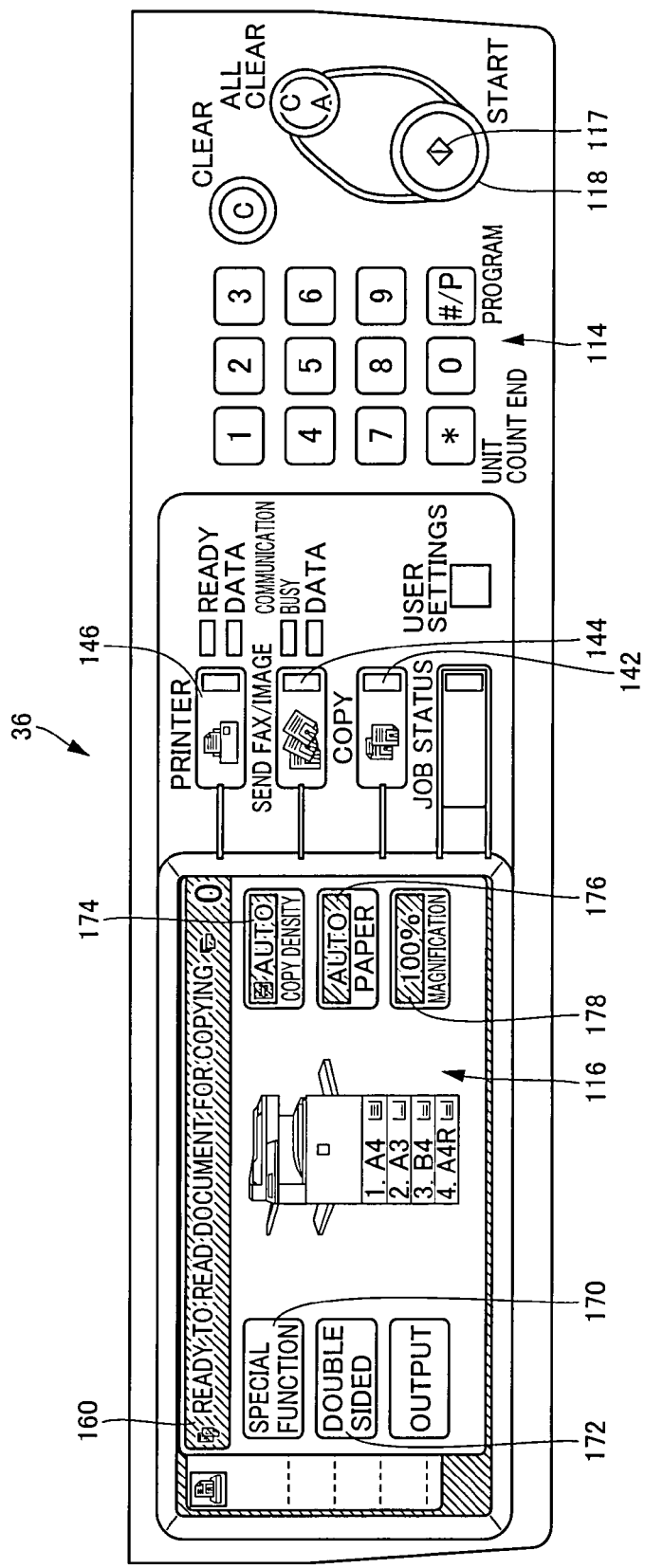
FIG. 5 shows an operating unit 36 of document feeding and reading unit 22.

Referring to FIG. 5, operating unit 36 includes: an operation panel 114 with ten keys and the like; a display panel 116 formed of liquid crystal; a start key 118; a copy mode button 142 for switching operational mode of image forming apparatus 20 to copy mode; a facsimile mode button 144 for switching to facsimile/image transmission mode; and a printer mode button 146 for switching to print mode. A ready lamp 117 is provided in start key 118. While ready lamp 117 is on, an operation of start key 118 is valid, and while ready lamp 117 is off, an operation of start key 118 is invalid. On a surface of display panel 116, a touch panel is provided, and by operating the touch panel in accordance with the display, an operation instruction can be input to the apparatus.

In FIG. 5, display panel 116 shows an initial display 160 when image forming apparatus 20 is in the copy mode. As described above, on the surface of display panel 116, a touch panel is provided, and when a soft key displayed on display panel 116 is pressed, a process corresponding to the soft key is executed. Referring to FIG. 5, initial display 160 includes: a special function key 170 for a transition to a special function setting mode in which reading mode is set; a double-sided copy key for a transition to a double-sided copy setting mode; a density setting key 174 for a transition to a reading density setting mode when a document is read; a document size key 176 for a transition to a document size setting mode; and a magnification setting key 178 for a transition to an expansion/reduction setting mode.

Referring to FIG. 6, document feeding and reading unit 22 includes a control unit 100 implemented by a CPU (Central Processing Unit) or the like and controls overall operation of document feeding and reading unit 22 by executing a prescribed program; and an ROM (Read-Only Memory) 102 storing program and data necessary for controlling the operation of document feeding and reading unit 22. Control unit 100 controls document feeding and reading unit 22 in accordance with the program and data stored in ROM 102, and executes control related to various functions of document feeding and reading unit 22. Document feeding and reading unit 22 further includes: a document feeding unit 90 for feeding the document under the control by control unit 100; an RAM (Random Access Memory) 104 for temporarily storing image data and result of operation by control unit 100; a communication unit 106 for communication with a network line L connected to a personal computer (hereinafter denoted as "PC") and a facsimile apparatus, not shown; an HDD (Hard Disk Drive) 108 for storing input data to document feeding and reading unit 22 and processed image data; and an operating unit 36 for receiving user input.

As described above, operating unit 36 includes operation panel 114, display panel 116 also serving as a touch panel, start key 118, and ready lamp 117 embedded in start key 118.

Document feeding and reading unit 22 further includes document cover opening/closing detection sensor 128, the plurality of reflective sensors 130, first document reading unit 48, second document reading unit 58, and document detection sensor 34.

These elements are all connected to control unit 100 through a bus 110. Document feeding unit 90, ROM 102, RAM 104, communication unit 106, HDD 108, operation panel 114, display panel 116, ready lamp 117, start key 118, first document reading unit 48, second document reading unit 58, document cover opening/closing detection sensor 128, document detection sensor 34, and reflective sensors 130 are controlled by control unit 100.

Figure 7A:
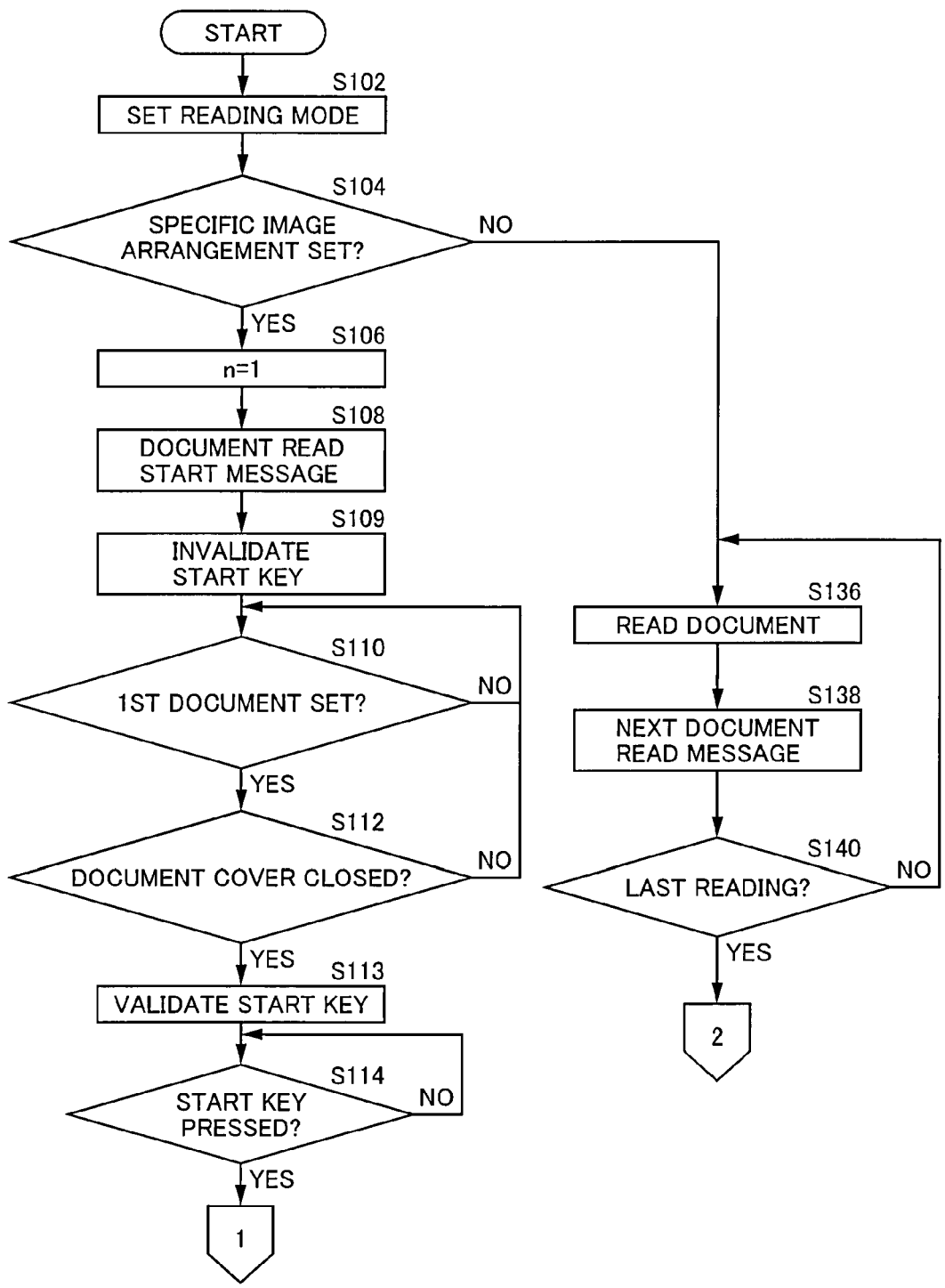
FIGS. 7A and 7B are flowcharts representing a control structure of a program executed by a control unit 100 of document feeding and reading unit 22, for controlling the document reading operation.
Figure 7B:
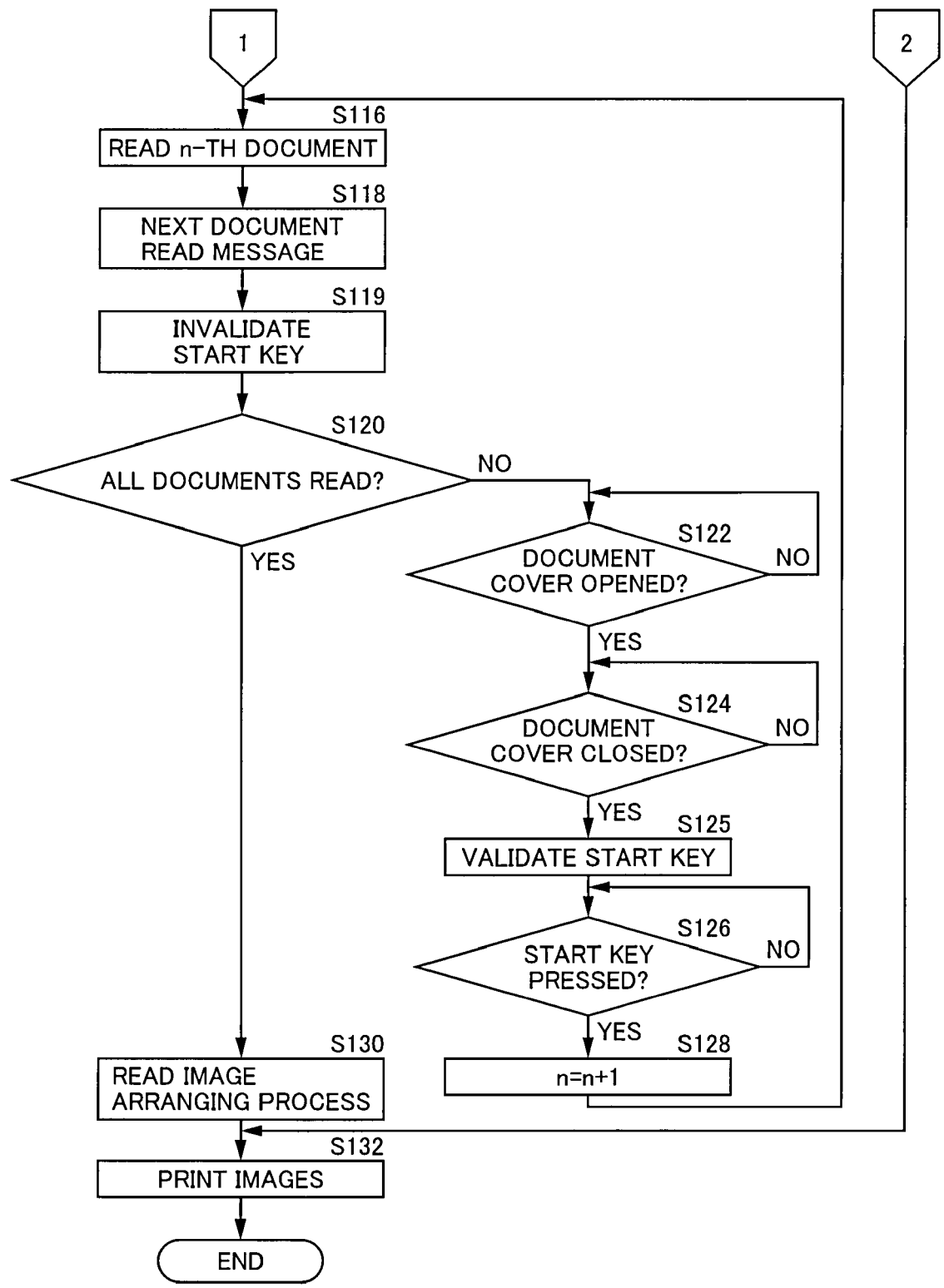

Referring to FIGS. 7A and 7B, the program executed by control unit 100 when the copy mode is selected includes the step (hereinafter simply denoted by "S") 102 of receiving setting of reading mode by the user, and S104 executed following S102, of determining whether the set reading mode uses a specific image arrangement or not, and branching the control flow depending on the result of determination.

An exemplary display on display panel 116 at S102 will be described with reference to FIGS. 5, 7A, 7B and 8 to 10. The initial display 160 in the copy mode shown in FIG. 5 allows setting of various reading modes in the copy mode including reading density setting, paper size setting, expansion/reduction copy setting, double-sided copy setting and special function print setting. Assume that the user pressed special function key 170 instructing a transition to the special function setting mode. An exemplary display here is as shown in FIG. 8.

Figure 8:
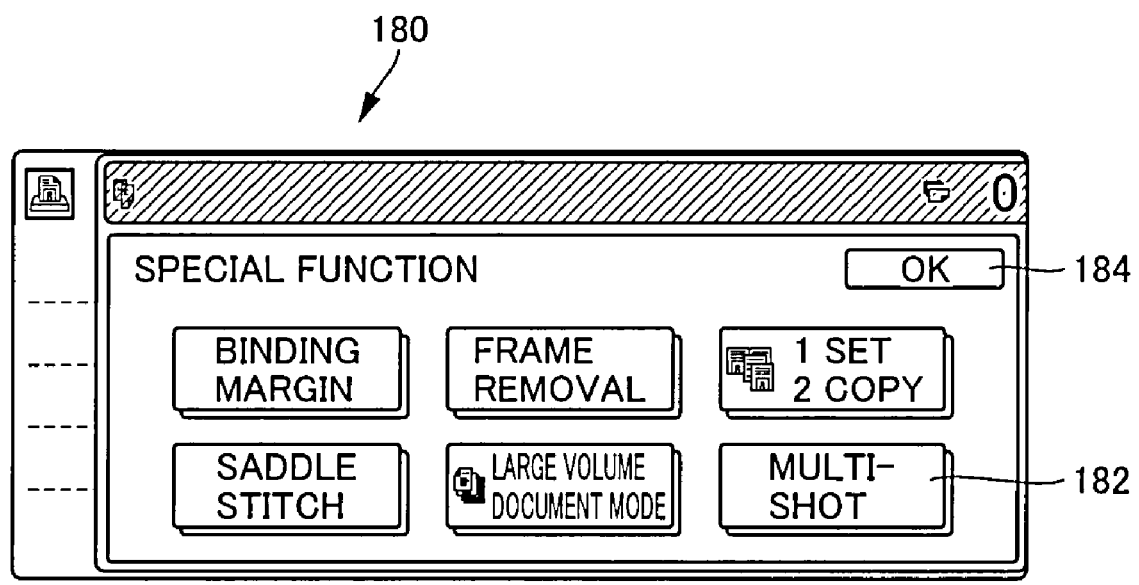
FIG. 8 shows a special function setting image 180 displayed on a display panel 116 upon entrance to a special function setting mode.

Referring to FIG. 8, special function setting image 180 includes a multi-shot key 182 for setting a multi-shot function, various software keys for setting a selected function, and an OK key 184 for returning to the initial display 160 after setting of a desired function.

Figure 9:
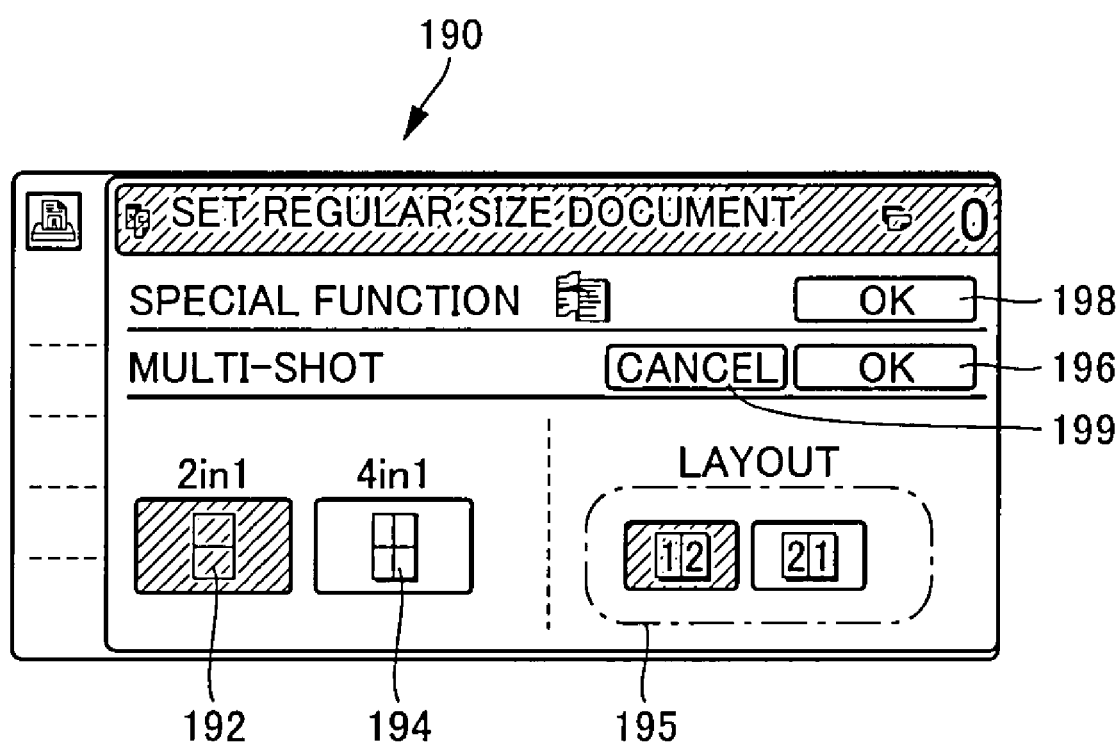
FIG. 9 represents a multi-shot setting image 190 displayed on display panel 116 when multi-shot function is selected.

Referring to FIG. 9, multi-shot setting image 190 includes: a 2-in-1 key 192 for setting a 2-in-1 mode as the reading mode; a 4-in-1 key 194 for selecting a 4-in-1 mode as the reading mode; a layout key 195 for selecting how the two or four images are to be arranged on one sheet of recording paper when the 2-in-1 or 4-in-1 mode is selected; an OK key 196 for determining the selected key and returning to the special function setting image 180; an OK key 198 for determining the selected mode and returning to initial display 160; and a cancel key 199 for cancelling the selected mode and returning to the special function setting image 180. In the exemplary display of FIG. 9, 2-in-1 mode is selected and, therefore, two keys are displayed on layout key 195. When 4-in-1 mode is selected, four keys are displayed on layout key 195.

Figure 10:
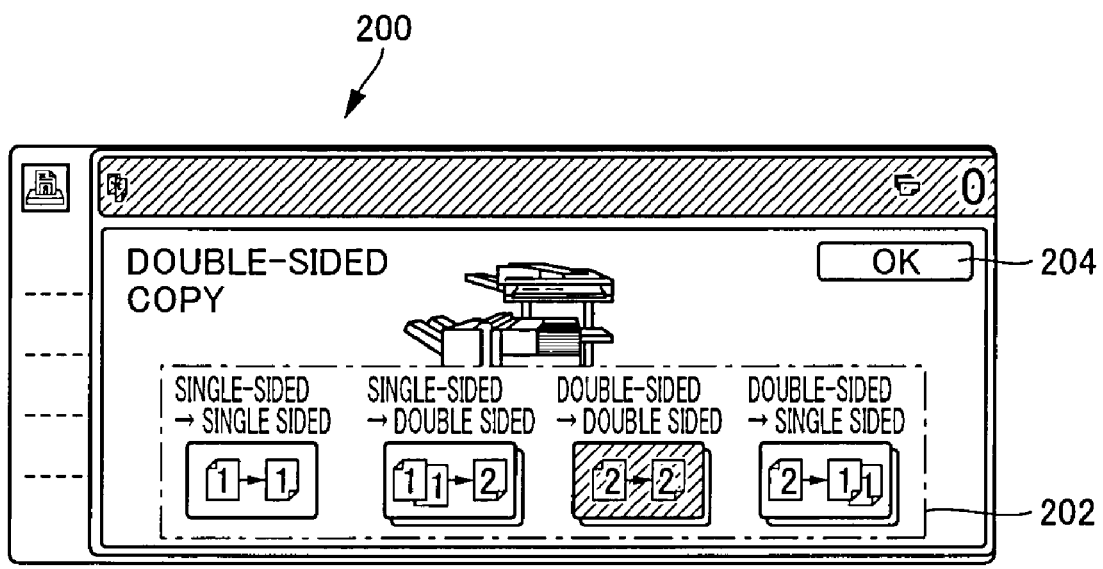
FIG. 10 represents a double-sided copy setting image 200 displayed on display panel 116 upon entrance to double-sided copy setting mode.

Referring to FIG. 10, double-sided copy setting image 200 includes: a double-sided copy setting key 202 for setting any of single-sided to single-sided copy mode, single-sided to double-sided copy mode, double-sided to double-sided copy mode and double-sided to single-sided copy mode; and an OK key 204 for storing the copy mode setting and returning to the initial display 160.

Referring to FIG. 5, when special function key 170 is pressed, there is a transition to special function setting image 180 of FIG. 8. When multi-shot key 182 is pressed on the image of FIG. 8, there is a transition to multi-shot setting image 190 of FIG. 9. When a layout is set on multi-shot setting image 190 and OK key 196 is pressed, the display returns to the special function setting image 180 of FIG. 8, allowing other settings. When OK key 198 on multi-shot setting image 190 of FIG. 9 is pressed or OK key 184 on special function setting image 180 is pressed, the image returns to the initial display 160 shown in FIG. 5. When start key 118 is pressed in this state, the process of S102 shown in FIG. 7A ends, and control proceeds to S104.

In the present embodiment, it is determined to be a special image arrangement setting at S104 if single-sided to double-sided copy, double-sided to double-sided copy, and double-sided to single-sided copy is set, or if print setting of 2-in-1 or 4-in-1 is set. If document sheets for such setting are to be read without using ADF, it is necessary to read document sheets using platen glass 44 and to exchange sheets of document every time one sheet of document is read.

Again referring to FIGS. 7A and 7B, the program further includes S106 executed if it is determined to be a special image arrangement setting at S104 (YES), of inputting an initial value of 1 to a variable n for counting the number of sheets of the document to be read; S108 executed following S106, of displaying a read start message; S109 executed following S108, of turning off ready lamp 117 of start key 118, to invalidate an operation of start key 118; S110 executed following S109, of determining whether the first sheet of document has been set on platen glass 44 based on platen status value E from reflective sensors 130, and branching control flow depending on the result of determination; S112 executed if it is determined at S110 that the first sheet of document has been set (YES), of determining whether or not document cover 122 has been closed from the output value (cover opening/closing value) of document cover opening/closing detection sensor 128, and branching control flow depending on the result of determination; and S113 executed if it is determined at S112 that document cover 122 has been closed (D=0) (YES), of turning on the ready lamp 117 to validate the operation of start key 118.

Figure 11:
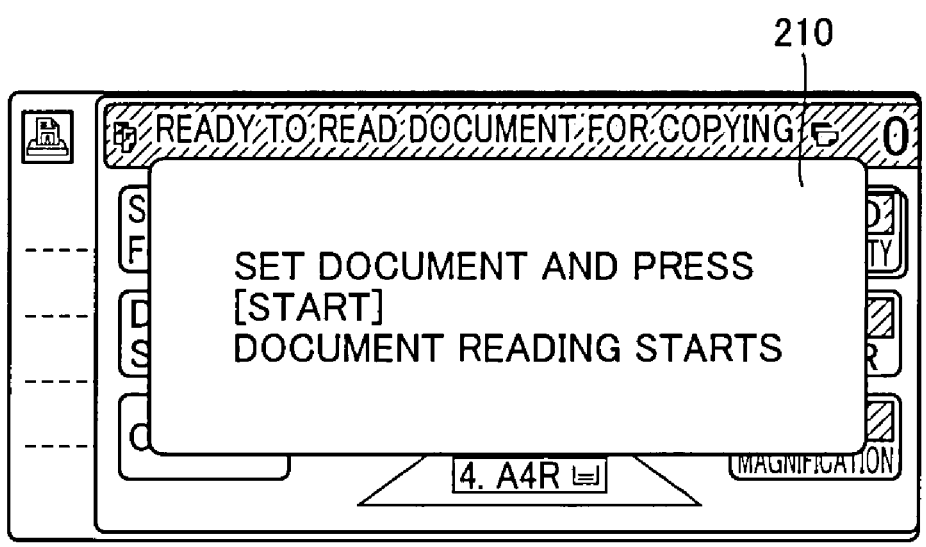
FIG. 11 shows a read start message 210 guiding start of document reading.

FIG. 11 shows read start message 210 that guides start of document reading, displayed on display panel 116 at S108.

Whether a document has been set on platen glass 44 or not is determined from the value (platen status value) E as a logical sum signal of detection signals of reflective sensors 130. If platen status value E=1, it is determined that the first sheet of document has been set, and otherwise, it is determined that no document sheet is set.

If it is determined at S110 that the first sheet of document has not been set (E=0) (NO), control returns to S110. If it is determined at S112 that the document cover is not closed (NO), control returns to S110. Specifically, document reading is inhibited unless the document is set on platen glass 44 and document cover 122 is closed. At this time, ready lamp 117 of start key 118 is off, notifying the user that document reading is inhibited.

The program further includes S114 executed following S113, of determining whether start key 118 is pressed or not and branching control flow depending on the result of determination; and S116 executed if it is determined at step S114 that start key 118 has been pressed (YES), of reading n-th sheet of document and storing the read image data together with a value of variable n indicating the order of reading, in RAM 104. If it is determined at S114 that start key 118 has not been pressed (NO), control returns to S114.

The program further includes S118 executed following S116, of displaying a message urging exchange of document sheet on display panel 116; S119 executed following S118, of turning off ready lamp 117 of start key 118 to invalidate an operation; S120 executed following S119, of determining whether read end key 222 has been pressed or not and branching control flow depending on the result of determination; and S122 executed if it is determined at S120 that read end key has not been pressed (NO), of determining whether or not document cover 122 has been opened, and branching control flow depending on the result of determination. If it is determined at S122 that the document cover has not been opened (D=0) (NO), control returns to S122.

Figure 12:
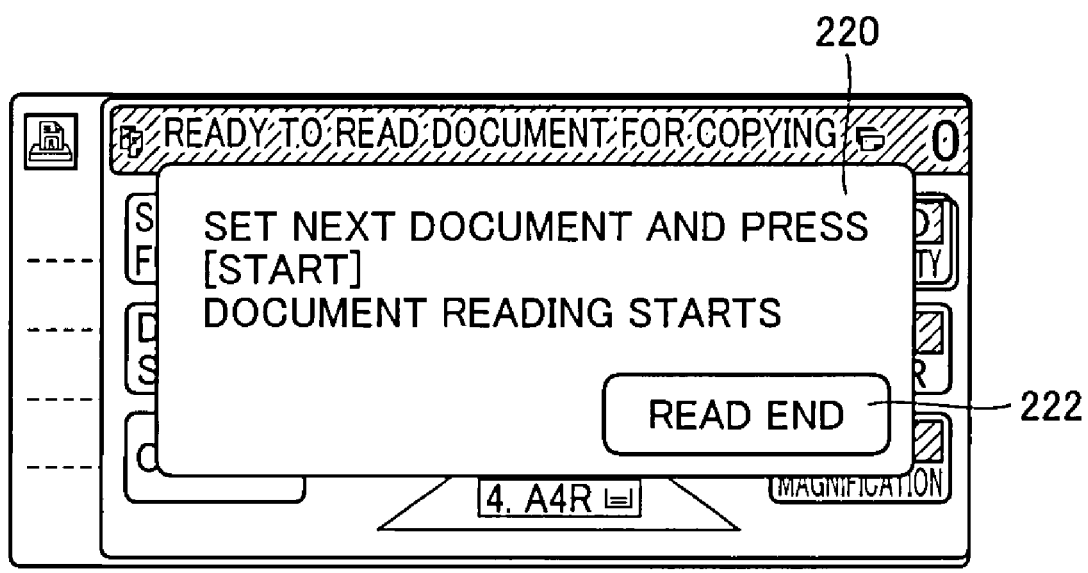
FIG. 12 shows a display 220 urging exchange of a document sheet.

FIG. 12 shows a display 220 notifying exchange of document sheet displayed on display panel 116 at S118. Display 220 includes a read end key 222 to instruct end of reading. Display panel 116 is a touch panel and, receiving an input of read end key 222, a read end signal is issued. Further, when display 220 is displayed, ready lamp 117 of start key 118 is off, notifying the user that document reading is inhibited.

The program further includes S124 executed if it is determined at S122 that the document cover has been opened (D=1) (YES), of determining whether the document cover has been closed or not and branching control flow depending on the result of determination; and S125 executed if it is determined at S124 that the document cover has been closed (YES), of turning on the ready lamp 117 and validating an operation of start key 118.

If it is determined at S124 that the document cover has not been closed (NO), control returns to S124. Specifically, until the document cover is closed, reading of the next sheet of document cannot be started, and document reading is substantially inhibited.

The program further includes S126 executed following S125, of determining whether or not start key 118 has been pressed, and branching control flow depending on the result of determination; and S128 executed if it is determined at S126 that start key 118 has been pressed (YES), of setting variable n to n+1, and returning control to S116. If it is determined at S126 that start key 118 has not been pressed (NO), control returns to S126.

The program further includes S130 executed if it is determined at S120 that read end key 222 has been pressed (YES), of performing a read image arranging process in accordance with the set reading mode and reading order of respective images; and S132 executed following S130 of printing the read image data in accordance with the set print setting. After execution of S132, the program ends.

The program further includes S136 executed if it is determined at S104 that the specific image arrangement is not set (NO), of reading a sheet of document placed on platen glass 44, and storing the read image data in RAM 104; S138 executed following S136, of displaying a message urging exchange of document sheet on display panel 116; and S140 executed following S138, of determining whether or not read end key 222 instructing end of reading has been pressed, and branching control flow depending on the result of determination. If it is determined at S140 that read end key 222 has not been pressed (NO), control proceeds to S136. If it is determined at S140 that read end key 222 has been pressed (YES), control proceeds to S132.

The flowchart represents the flow executed in the copy mode. If the read image is to be transmitted by e-mail or to be stored as a file, image storing process or transmitting process may be executed in place of printing at S132. Generally, by the process performed on the document images at S130 and S132, it becomes possible to arrange the document images in N-in-1 manner and the like and to output the result as a file, to a sheet of recording paper or to e-mail.

—Operation—

Document feeding and reading unit 22 in accordance with the present embodiment operates in the following manner. Though the following description is limited to the copy mode, it is clearly understood that document feeding and reading unit 22 operates in the similar manner in other operation modes. Further, the operation of document feeding and reading unit 22 when ADF is used is not directly related to the present invention, and outline thereof has been already described in connection with the structure. Therefore, detailed description thereof will not be given here.

In the following description, it is assumed that the user intends 2-in-1 printing. Assume that image forming apparatus 20 is in the initial state and initial display 160 (see FIG. 5) is displayed on display panel 116. First, the user presses copy mode button 142 to select the copy mode. Next, "SPECIAL FUNCTION" is selected from initial display 160. Then, from special function setting image 180 (see FIG. 8) displayed next, "MULTI-SHOT" is selected. Then, the display is switched to multi-shot setting image 190 shown in FIG. 9. The user selects the 2-in-1 key 192 on multi-shot setting image 190, sets layout key 195, if necessary, and presses OK key 196 or OK key 198. Here, it is assumed that no other setting is done and OK key 198 is pressed. Then, the image returns to the initial display 160 of FIG. 5. It is noted, however, that the contents set by the user are displayed on initial display 160 (not shown in FIG. 5).

When the user presses start key 118 in this state, the process of S102 of FIG. 7A ends and control proceeds to S104. The result of determination at S104 is YES, and therefore, the control proceeds from S106 to S108. At S106, 1 is input to variable n, and at S108, a message "SET DOCUMENT AND PRESS [START]" appears on the display unit. At S109, ready lamp 117 of start key 118 is turned off.

The user opens document cover 122 (see FIGS. 2 and 3), sets a sheet of document on platen glass 44, and closes the document cover. Then, reflective sensors 130 detect setting of the document sheet. Further, document cover opening/closing detection sensor 128 detects closing of the document cover. Results of determination at S110 and S112 of FIG. 7A are both YES, so that the control proceeds to S113 at which an operation of start key 118 is validated and ready lamp 117 is turned on. When ready lamp 117 is turned on, the user presses start key 118 (YES at S114).

Document feeding and reading unit 22 reads the first sheet of document (S116). When reading of the first sheet of document ends, a message "SET NEXT DOCUMENT AND PRESS [START]" is displayed, start key 118 is validated (S119), and ready lamp 117 of start key 118 is turned off. If the next sheet is to be read, the user opens document cover 122, takes out the first sheet of document from platen glass 44, places the second sheet of document on platen glass 44, and closes document cover 122. Then, reflective sensors 130 detect setting of the document sheet, and document cover opening/closing detection sensor 128 detects closing of document cover 122. The results of determination at S122 and S124 of FIG. 7B are YES, and at S125, start key 118 is validated. As the ready lamp 117 of start key 118 is turned on, the user presses start key 118 (YES at S126). To the variable n representing the number of sheets, 1 is added (S128), and at S116, document feeding and reading unit 22 reads the next sheet of document. Thereafter, the above-described process steps are repeated if there is third or more sheets of document.

When reading of all document sheets ends, the user touches read end key 222 that appears in the display 220 (see FIG. 12) urging exchange of document sheet displayed at S118. Then, the result of determination at S120 of FIG. 7B is YES, and images read by the process steps until then are re-arranged in 2-in-1 form at S130, and the images as such are printed at S132.

Processes for specific image arrangement setting such as 4-in-1 and double-sided copy are similar to those described above. Only the form of re-arrangement at S130 differs. Therefore, detailed description thereof will not be given here.

As described above, in image forming apparatus 20 having document feeding and reading unit 22 in accordance with the present embodiment, when a specific image arrangement requiring consideration of document reading order is designated, the program shown in FIGS. 7A and 7B is executed, to once invalidate operation of start key 118 after an image is captured. If a sheet of document is left forgotten, that is, if opening/closing of document cover 122 is not confirmed (results of determination at S122 and S124 of FIG. 7B are not both YES), operation of start key 118 is kept invalid. Therefore, erroneous operation such as pressing start key 118 again with the document not exchanged, mixing up the correct order of reading, can be prevented.

Though not mentioned in the embodiment above, a card-shot function is an example of print setting that requires a specific image arrangement similar to 2-in-1 and the like. The card-shot function refers to a function of separately reading front and rear surfaces of a card and printing the read images side by side on one sheet of paper.

Though document feeding and reading unit 22 and the image forming apparatus 20 have been described not specifying whether these are of black-and-white/color type, the present invention is applicable both to black-and-white/color type apparatuses.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image processing apparatus, comprising:
    a platen;
    a document cover attached to be opened/closed on the platen;
    a document reader provided in relation to the platen, for reading an image of a document placed on said platen;
    an opening/closing detector, provided in relation to said platen and said document cover, for detecting opening/closing of said document cover;
    an operation panel designating how the read images of the document are to be arranged on a recording medium at the time of output;
    a document output device for outputting images of the document read by said document reader arranged on a recording medium in accordance with the arrangement designated by said operation panel; and
    a reading operation controller inhibiting document reading by said document reader, when a specific arrangement of document images is designated by said operation panel and opening/closing operation of said document cover is not detected by said opening/closing detector.

2. The image processing apparatus according to claim 1, wherein
    said reading operation controller inhibits reading of a document by said document reader, when closed state of said document cover is not detected by said opening/closing detector.

3. The image processing apparatus according to claim 2, wherein
    said reading operation controller inhibits, when said specific arrangement of document images is designated by said operation panel, reading of a next document by said document reader until opening/closing of said document cover is detected by said opening/closing detector after reading of document by the document reader.

4. The image processing apparatus according to claim 3, further comprising
    an inhibited state notifying device notifying inhibition of document reading, when document reading by said document reader is inhibited by said reading operation controller.

5. The image processing apparatus according to claim 4, further comprising
    a document exchange notifying device notifying necessity of exchanging document, when reading of a next document by said document reader is inhibited by said reading operation controller.

6. The image processing apparatus according to claim 5, further comprising
    an end-of-reading input device, receiving a user input indicating end of document reading in response to notification that document exchange is necessary from said document exchange notifying device, for ending document reading by said document reader.

7. The image processing apparatus according to claim 6, wherein
    said specific arrangement of document images is N-in-1.

8. The image processing apparatus according to claim 7, wherein
    said specific arrangement of document images is double-sided copy.

9. The image processing apparatus according to claim 6, wherein
    said specific arrangement of document images is double-sided copy.

10. The image processing apparatus according to claim 3, further comprising
    a document exchange notifying device notifying necessity of exchanging document, when reading of a next document by said document reader is inhibited by said reading operation controller.

11. The image processing apparatus according to claim 10, further comprising
    an end-of-reading input device, receiving a user input indicating end of document reading in response to notification that document exchange is necessary from said document exchange notifying device, for ending document reading by said document reader.

12. The image processing apparatus according to claim 11, wherein
    said specific arrangement of document images is N-in-1.

13. The image processing apparatus according to claim 12, wherein
    said specific arrangement of document images is double-sided copy.

14. The image processing apparatus according to claim 11, wherein
    said specific arrangement of document images is double-sided copy.

15. An image processing method, comprising the steps of:
    a computer detecting opening/closing of a document cover attached to be opened/closed on a platen;
    the computer receiving a designation input by a user related to a manner of arranging read document at the time of output on a recording medium;
    the computer reading an image of a document placed on said platen;
    the computer outputting images of the document read at said reading step on a recording medium, in accordance with document arrangement designated by said user; and
    the computer inhibiting reading of a next document, if a specific arrangement of document images is designated by said user and opening/closing operation of said document cover is not detected at said detecting step.

16. The image processing method according to claim 15, further comprising the step of
    the computer notifying necessity of document exchange, in response to inhibition of reading of the next document at said inhibiting step.

17. The image processing method according to claim 16, further comprising the step of
    the computer receiving an input by the user indicating end of document reading in response to the notification of necessity of document exchange at said notifying step, and ending reading of said document image.

* * * * *